(12) United States Patent
Smith

(10) Patent No.: US 9,581,478 B1
(45) Date of Patent: Feb. 28, 2017

(54) POOL SKIMMER FLOW MEASURING SYSTEMS

(71) Applicant: Totally New Technologies LLC, Goodlettsville, TN (US)

(72) Inventor: Ronnie E. Smith, Goodlettsville, TN (US)

(73) Assignee: Totally New Technologies LLC, Nashville, TN (US)

( * ) Notice: Subject to any disclaimer, the term of this patent is extended or adjusted under 35 U.S.C. 154(b) by 0 days.

(21) Appl. No.: 14/939,899

(22) Filed: Nov. 12, 2015

Related U.S. Application Data

(60) Provisional application No. 62/079,284, filed on Nov. 13, 2014.

(51) Int. Cl.
  *G01F 1/68* (2006.01)
  *G01F 1/66* (2006.01)
  *E04H 4/12* (2006.01)

(52) U.S. Cl.
  CPC ............ *G01F 1/666* (2013.01); *E04H 4/1245* (2013.01); *E04H 4/1272* (2013.01); *G01F 1/662* (2013.01)

(58) Field of Classification Search
  CPC ... G01F 23/26; G01F 1/68; E01H 4/00; C02F 1/00
  USPC ..... 73/861.18, 304 C; 4/508; 210/167.1, 739
  See application file for complete search history.

(56) References Cited

U.S. PATENT DOCUMENTS

| | | | |
|---|---|---|---|
| 3,087,335 A | 4/1963 | Cavenah | |
| 3,169,920 A | 2/1965 | Payne | |
| 4,022,690 A | 5/1977 | Smith | |
| 4,604,610 A | 8/1986 | Baker | |
| 5,049,859 A | 9/1991 | Arnell | |
| 5,121,104 A | 6/1992 | Nelson | |
| 5,804,080 A * | 9/1998 | Klingenberger | B01D 24/00 210/103 |
| 6,568,264 B2 * | 5/2003 | Heger | G01F 23/265 340/618 |
| 7,178,410 B2 | 2/2007 | Fraden | |
| 7,247,069 B2 | 7/2007 | Porat | |
| 7,490,512 B2 | 2/2009 | Fraden | |
| 7,752,893 B2 | 7/2010 | Biberger | |
| 8,465,262 B2 | 6/2013 | Stiles, Jr. | |
| 8,636,899 B2 | 1/2014 | Tesauro | |
| 8,704,672 B2 | 4/2014 | Hoglund | |
| 8,721,881 B1 * | 5/2014 | Smith | E04H 4/1272 210/167.1 |
| 2004/0187203 A1 * | 9/2004 | Gibson | E04H 4/12 4/508 |
| 2011/0114202 A1 | 5/2011 | Goseco | |
| 2012/0073040 A1 | 3/2012 | Cohen | |
| 2012/0125592 A1 | 5/2012 | Fadell | |
| 2012/0187029 A1 | 7/2012 | Lauro | |

(Continued)

*Primary Examiner* — Jewel V Thompson
(74) *Attorney, Agent, or Firm* — Shane V. Cortesi

(57) ABSTRACT

The present invention relates to systems that allow users to observe the operation of pool skimmers. In some embodiments, the system includes a flow sensor system, which may be located in a ring above the skimmer basket. The flow sensor system may include, for example a microphone or a paddle wheel. Optionally, the system may further include a remote computer (e.g., smart phone/tablet computer) that receives the inputs measured by the flow sensor system and displays on its display screen alerts based on the inputs (e.g., to notify the user to clean the skimmer basket or backwash the filter).

15 Claims, 7 Drawing Sheets

(56) References Cited

U.S. PATENT DOCUMENTS

2013/0325368 A1 12/2013 Robb
2014/0016122 A1 1/2014 Clark
2014/0217185 A1 8/2014 Bicknell

* cited by examiner

POOL SKIMMER FLOW MEASURING SYSTEMS

RELATED APPLICATIONS

This application claims priority under 35 U.S.C. 119 to U.S. Provisional Application No. 62/079,284, filed Nov. 13, 2014, the entire contents of which are incorporated hereby by reference.

BACKGROUND

Technical Field

The present invention relates to systems configured to measure the flow of water in pool skimmers.

Background of the Invention

With reference to FIGS. 1-3, in the prior art, it is known to remove debris in swimming pools 110 through the use of skimmers 100. Skimmers 100 generally include a rectangular skimmer opening 135 located in a sidewall 120 of the swimming pool 110, a moveable weir 170 that pivots on a hinge 155 within the skimmer 100 and moves in response to changes in the water levels of the swimming pool 110, and a skimmer basket 160. The skimmer basket 160 sits in a well 198 located in the interior 137 of the skimmer 100, collects debris and must be emptied. The skimmer basket 160 has a basket interior 167, a basket exterior 168, a floor 161, a top/rim 162, a height 165 extending from the floor 161 to the top/rim 162, one or more sidewalls 163 extending upwardly from the floor 161, and a plurality of apertures located in the floor 161 and/or the sidewalls 163. The basket floor 161 and the basket sidewall 163 separate the basket interior 167 from the basket exterior 168. The skimmer 100 has an access opening 197 that is removably closed by a lid 199 in order to empty the skimmer basket 160.

Water enters the skimmer 100 through the opening 135, flows through water passageway 196 and over the weir 170, and through the skimmer basket 160. Ultimately, the filtered water is then pumped back into the swimming pool 110 through water jets 175 located in the pool sidewalls 120 using a pump 190 and a series of pipes 180, 181, 182 and 193. The capacity of pool pumps 190 is usually provided in gallons per minute (gpm), which refers to the amount of water that the pump 190 is able to circulate in a minute. The pump 190 is usually connected to a pool drain 195 in addition to the skimmer 100, and in some cases the pool owner is able to adjust the rate at which the pump 190 pulls water into the skimmer 100 by closing the drain valve 194. However, closing the drain valve 194 requires manual intervention by the pool owner.

Unfortunately, skimmer baskets 160 fill up quickly with debris, particularly in residential areas with many trees. If the skimmer basket 160 becomes too full with debris, water is cut off from the pump 190, which can damage the pump 190. Thus, skimmer baskets 160 are a constant maintenance issue.

Thus, there is a need for cheap devices that allow users to quickly and easily review the operation of swimming pool skimmers and notify users when the basket 160 needs to be emptied.

BRIEF SUMMARY

The present invention relates to systems for measuring the operation of swimming pool skimmers. In some embodiments, the system includes:

a skimmer basket, the skimmer basket configured to be placed in a pool skimmer and comprising a basket interior, a basket exterior, a floor, a top, a height extending from the floor to the top, a sidewall extending upwardly from the floor, and a plurality of apertures located in at least one of the basket sidewall and the floor, wherein the basket floor and the basket sidewall separate the basket interior from the basket exterior;

a first tube attached to the skimmer basket, the first tube comprising a top, a bottom comprising an opening, a first tube height extending from the bottom to the top, an interior, an exterior comprising a first flange extending from the first tube towards the basket sidewall, and a first tube slot configured to feed water from the first tube exterior to the first tube interior and the basket interior, the first tube slot located between the top and the bottom of the first tube, the first tube slot having a width perpendicular to the first tube height and a height parallel to the first tube height; and a flow sensor system connected to the skimmer basket and configured to analyze water flowing through the system.

Optionally, the flow sensor system comprises a microphone configured to capture sound waves from water flowing through the system and transduce the sound waves into electrical signals, a microprocessor in communication with the microphone and configured to process signals received from the microphone, and a power source configured to power the microphone and the microprocessor. Optionally, the flow sensor system further comprises a transmitter configured to wirelessly transmit signals from the flow sensor system to a remote computer. Optionally, the remote computer is a mobile telephone comprising a graphical user interface (touchscreen). Optionally, the flow sensor system is attached to the first tube. Optionally, the system further comprises a second tube adjacent to the first tube, the second tube configured to rotate relative to the first tube and at least partially cover the first tube slot, the second tube comprising a top, a bottom, a second tube height extending from the bottom to the top, and a second tube slot located between the top and the bottom of the second tube, the second tube slot having a width perpendicular to the second tube height and a height parallel to the second tube height. Optionally, the tops of the first and second tubes each comprise openings. Optionally, the first tube is located inside the second tube interior. Optionally, the width of the first tube slot is at least about 1 inch, the width of the second tube slot is at least about 1 inch, the height of the first tube slot is at least about 4 inches and the height of the second tube slot is at least about 4 inches. Optionally, the first tube and the second tube are generally cylindrical. Optionally, the first tube height is greater than the second tube height, the second tube is located above the first flange and the first tube comprises an upper flange extending about a perimeter of the first tube, the upper flange located above the first flange and the second tube, and the flow sensor system is attached to the upper flange. Optionally, the first flange comprises a groove adjacent to the first tube and extending about a perimeter of the first tube, further wherein the bottom of the second tube is located in the groove. Optionally, the system further includes a pool, the pool comprising a sidewall, the pool sidewall comprising a pool skimmer, the pool skimmer comprising a skimmer interior, a plurality of walls defining the skimmer interior and a skimmer opening leading from the pool to the skimmer interior and the basket is located in the skimmer interior. Optionally, the system further includes a pool, the pool comprising a sidewall, and a pool skimmer attached to the sidewall, the pool skimmer comprising a skimmer interior, a plurality of walls defining the skimmer interior and a skimmer opening leading from the pool to the skimmer interior and the basket is located in the skimmer interior. Optionally, the first flange and the skimmer basket are permanently attached to each other. Optionally, the first flange and the skimmer basket are mechanically attached to each other. Optionally, the first flange is pivotally attached to the skimmer basket by a hinge. Optionally, the first flange is removably attached to the skimmer basket by a fastener. Optionally, the fastener is at least about 3 inches in length and comprises threads. Optionally, the first flange and the basket comprise mating threads for removably attaching the first flange to the basket. Optionally, the first tube slot comprises a top and a bottom, and the bottom of the first tube slot is adjacent to a top of the first flange. Optionally, the system further comprises a washer attached to the first flange, the washer comprising a washer opening in fluid communication with the first tube bottom aperture. Optionally, the system is used in a method of measuring the velocity of water flowing into a skimmer basket, the method comprising the steps of: providing the system; flowing water through the slot of the first tube; and measuring the velocity of water entering through the slot of the first tube using the flow sensor system.

In some embodiments, the system is provided in a kit for measuring the velocity of water flowing into a skimmer basket that includes a first tube, the first tube comprising a top, a bottom comprising an opening, a height extending from the bottom to the top, an interior, an exterior, an inner diameter perpendicular to said height, an outer diameter perpendicular to said height, a first tube slot having a width of at least about 1 inch and a height of at least about 4 inches, the first tube slot width parallel to the inner and outer diameters of the first tube, the first tube slot height perpendicular to the inner and outer diameters of the first tube, the first tube exterior comprising a first flange extending from the first tube, the first flange configured to attach to a skimmer basket;

a second tube, the second tube comprising a top, a bottom comprising a bottom opening, a height extending from the bottom to the top, an interior, an exterior, an inner diameter perpendicular to said height, an outer diameter perpendicular to said height, and a second tube slot having a width of at least about 1 inch and a height of at least about 4 inches, the second tube slot width parallel to the inner and outer diameters of the second tube, the second tube slot height perpendicular to the inner and outer diameters of the second tube; and a flow sensor system connected to at least one of the first tube and the second tube and configured to measure water flowing through at least one of the first tube and the second tube.

Optionally, the flow sensor system comprises a microphone configured to capture sound waves from water flowing through the system and transduce the sound waves into electrical signals, a microprocessor in communication with the microphone and configured to process signals received from the microphone, and a power source configured to power the microphone and the microprocessor. Optionally, the flow sensor system further comprises a transmitter configured to wirelessly transmit signals from the flow sensor system to a remote computer. Optionally, the remote computer is a mobile telephone. Optionally, the flow sensor system is attached to the first tube. Optionally, the kit further includes an upper flange extending about an outer circumference of the first tube. Optionally, the flow sensor system is attached to the upper flange. Optionally, the inner diameter of the second tube is between about 100% and about 120% of the size of the outer diameter of the first tube. Optionally, the first flange comprises a groove adjacent to the first tube and extending about an outer circumference of the first tube.

In some embodiments, the system includes:

a pool comprising a basin (swimming area);

a skimmer interior, a plurality of walls defining the skimmer interior and a skimmer opening leading from the pool basin to the skimmer interior;

a pump configured to pump water from the skimmer interior to the pool basin;

a remote computer; and a flow sensor system configured to measure water flowing through the skimmer interior, the sensor system comprising a sensor configured to generate electrical signals in response to conditions in the system, a power source configured to power the sensor, and a transmitter configured to wirelessly transmit signals from the flow sensor system to the remote computer.

Optionally, the sensor is a paddle wheel or microphone. Optionally, the flow sensor system comprises a microphone configured to capture sound waves from water flowing through the skimmer interior and transduce the sound waves into an electrical signal, a microprocessor in communication with the microphone and configured to process signals received from the microphone, and a power source configured to power the microphone and the microprocessor. Optionally, the remote computer is a mobile telephone.

In still further embodiments, the system includes:

a pool comprising a basin;

a skimmer interior, a plurality of walls defining the skimmer interior and a skimmer opening leading from the pool basin to the skimmer interior;

a pump configured to pump water from the skimmer interior to the pool basin; and a flow sensor system comprising a microphone configured to capture sound waves from water flowing through the skimmer interior and transduce the sound waves into electrical signals, a microprocessor in communication with the microphone and configured to process signals received from the microphone, and a power source configured to power the microphone and the microprocessor.

In still further embodiments, the system includes:

a pool comprising a basin;

a microphone system comprising a microphone adjacent to the basin and configured to capture sound waves and transduce the sound waves into electrical signals, a microprocessor in communication with the microphone and configured to process signals received from the microphone, and a power source configured to power the microphone and the microprocessor; and a pump configured to pump water from the skimmer interior to the pool basin, the pump in electronic communication with the microphone system.

For example, the microphone system may be in direct or indirect communication with the pump and the pump may be configured to turn on when the microphone system detects the presence of people in the pool basin. In a non-limiting embodiment, the microphone system may be located in the skimmer interior and the microphone may, for example, detect people moving in the pool basin and send an electrical signal directly to the pump or indirectly to the pump through the remote computer to tell the pump to turn on.

Optionally, the flow sensor systems include a camera and the microprocessor is in communication with the camera and is configured to transmit images taken from the camera to the remote computer.

Optionally, any of the flow sensor systems and/or remote computers are used to control mechanical devices associated with the swimming pool such as pumps, valve actuators, and robotic swimming pool cleaners.

DETAILED DESCRIPTION

Figure 1:
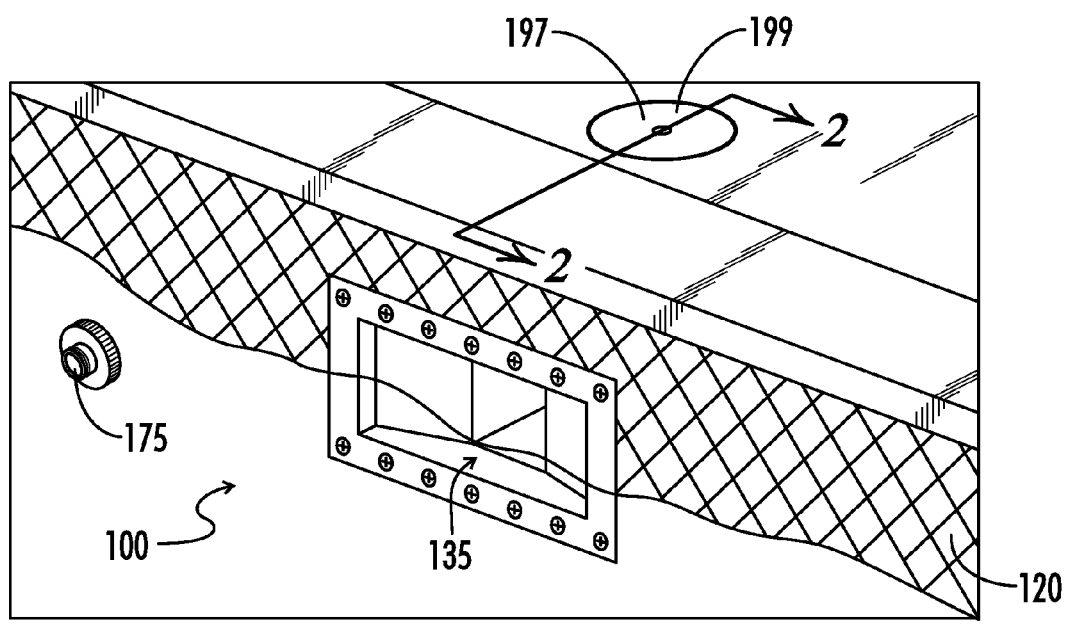
FIG. 1 illustrates a front, perspective view of a prior art skimmer and pool sidewall.
Figure 2:
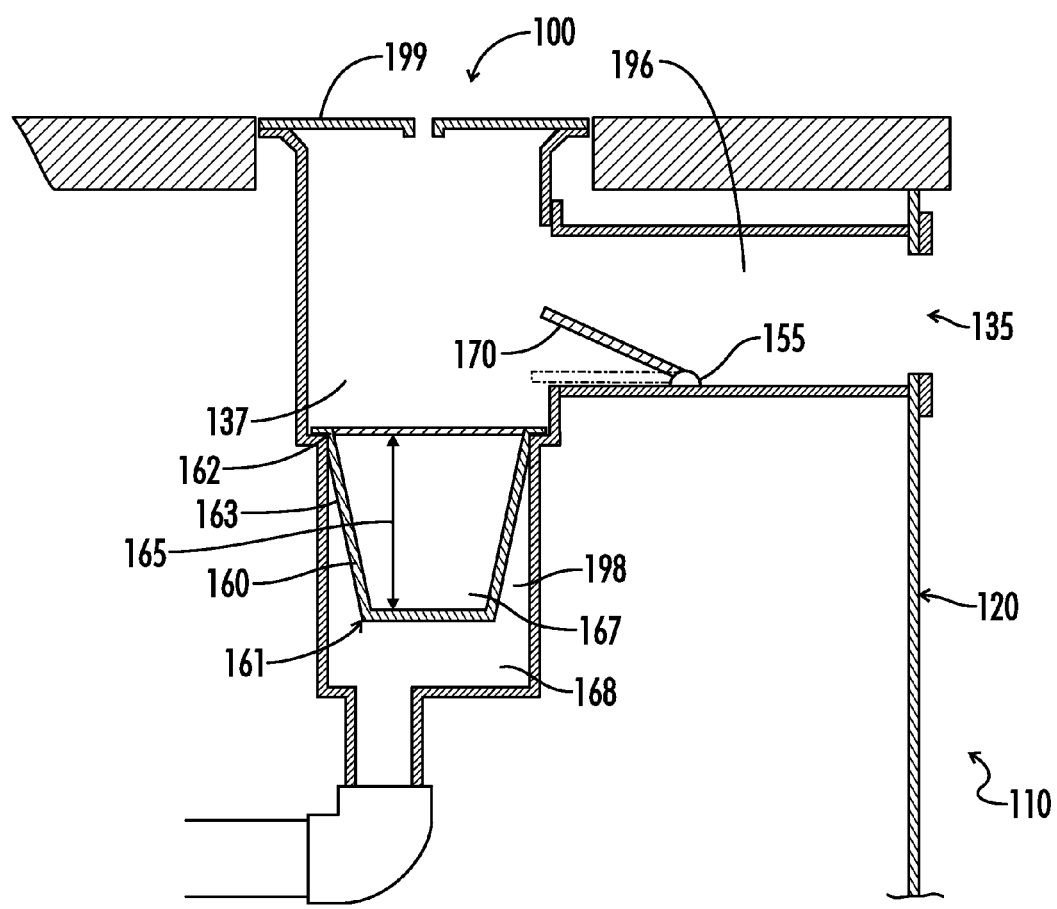
FIG. 2 illustrates a cross-sectional view of the prior art skimmer of FIG. 1, taken along line 2-2 of FIG. 1.
Figure 3:
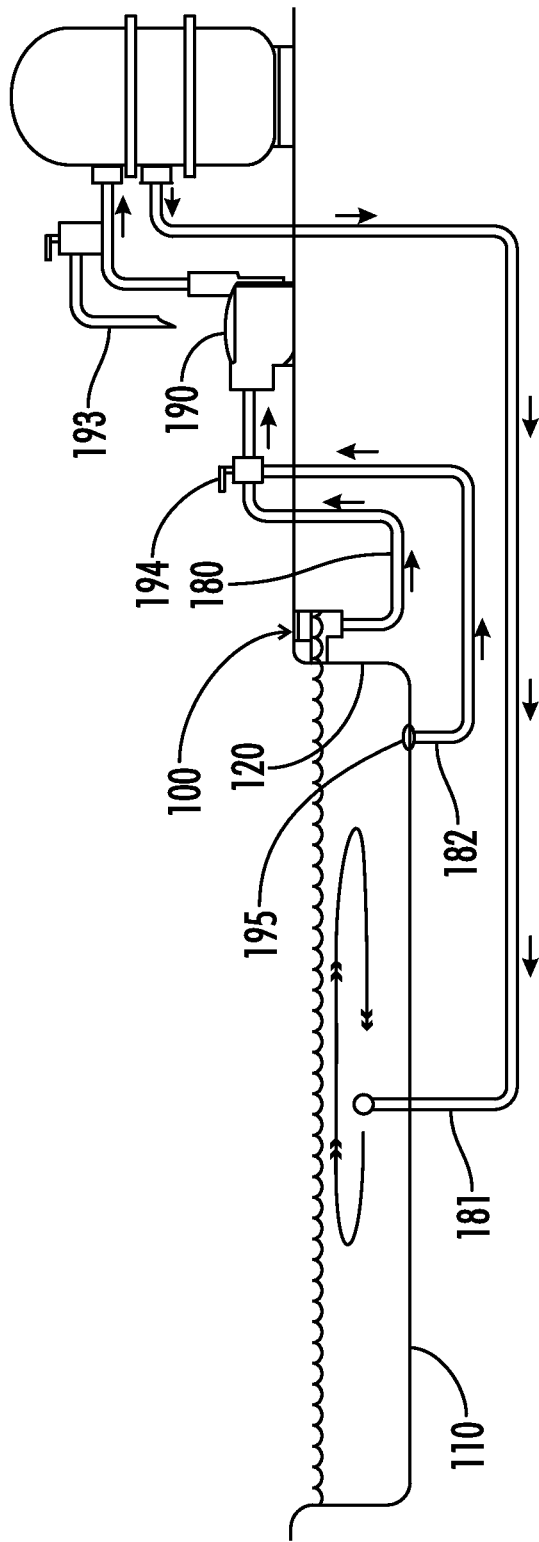
FIG. 3 illustrates a schematic view of water circulating in a clockwise fashion in a swimming pool with a prior art skimmer.

The present disclosure provides a system 200 for measuring the operation of a pool skimmer 100. In the drawings, not all reference numbers are included in each drawing for the sake of clarity. It will be understood that references herein to the singular form of a term encompass plural forms. The system 200 may be used in conjunction with any suitable pool skimmer, and are preferably used with immobile skimmers that are located in swimming pool, pond, fountain, or spa sidewalls, such as the skimmer 100 illustrated in FIGS. 1-3. As used herein, the term "pool" means a swimming pool, pond, fountain or spa. While, the system 200 may be used in spas, it will be appreciated that the system 200 is preferably used in swimming pools, given that spas generally have a small surface area and collect less debris than pools.

Figure 4:
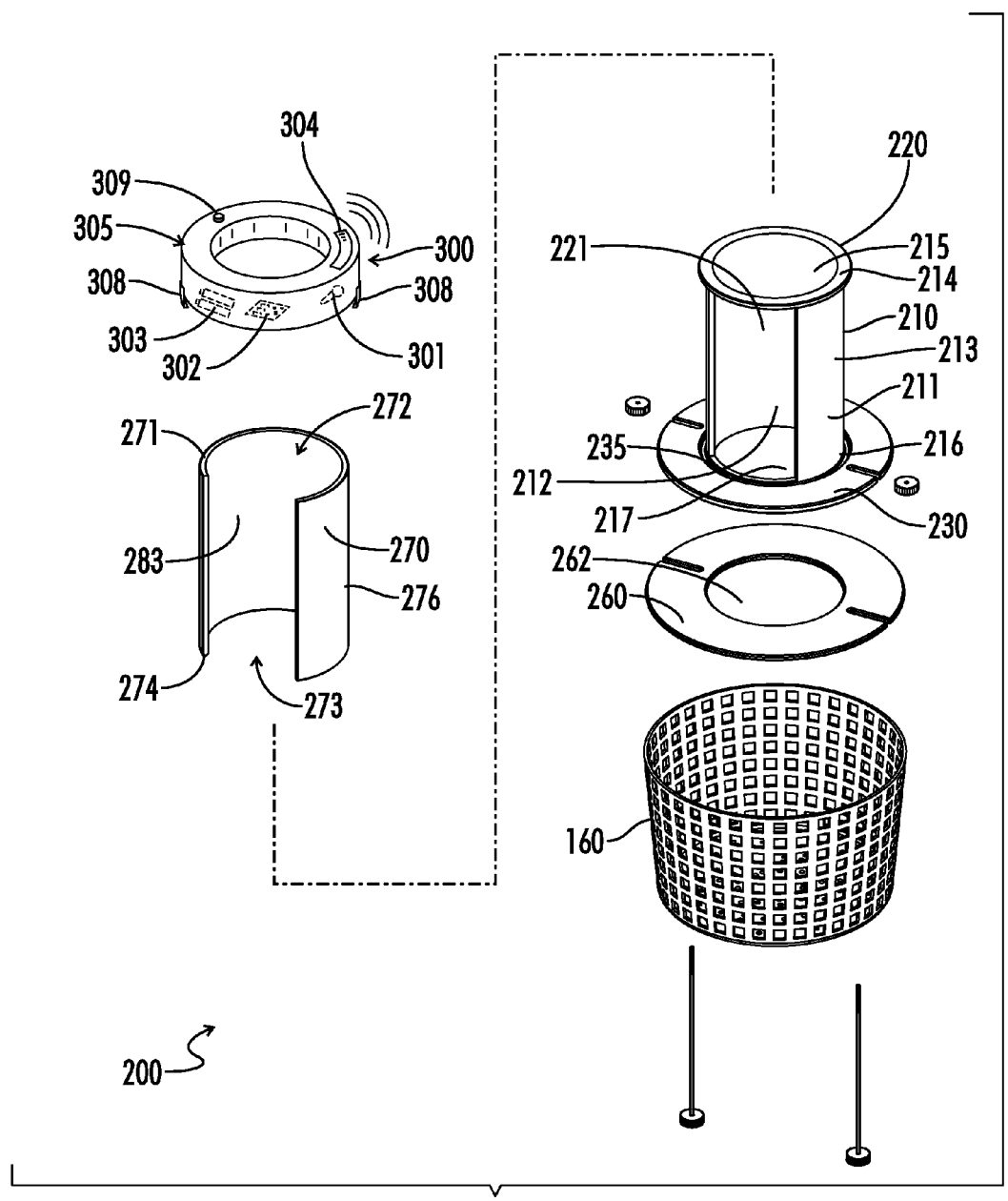
FIG. 4 illustrates a front, perspective, exploded view of a system of one embodiment of the present invention, which includes a flow sensor system that attaches to a tube, which, in turn, is attached to a skimmer basket.
Figure 5:
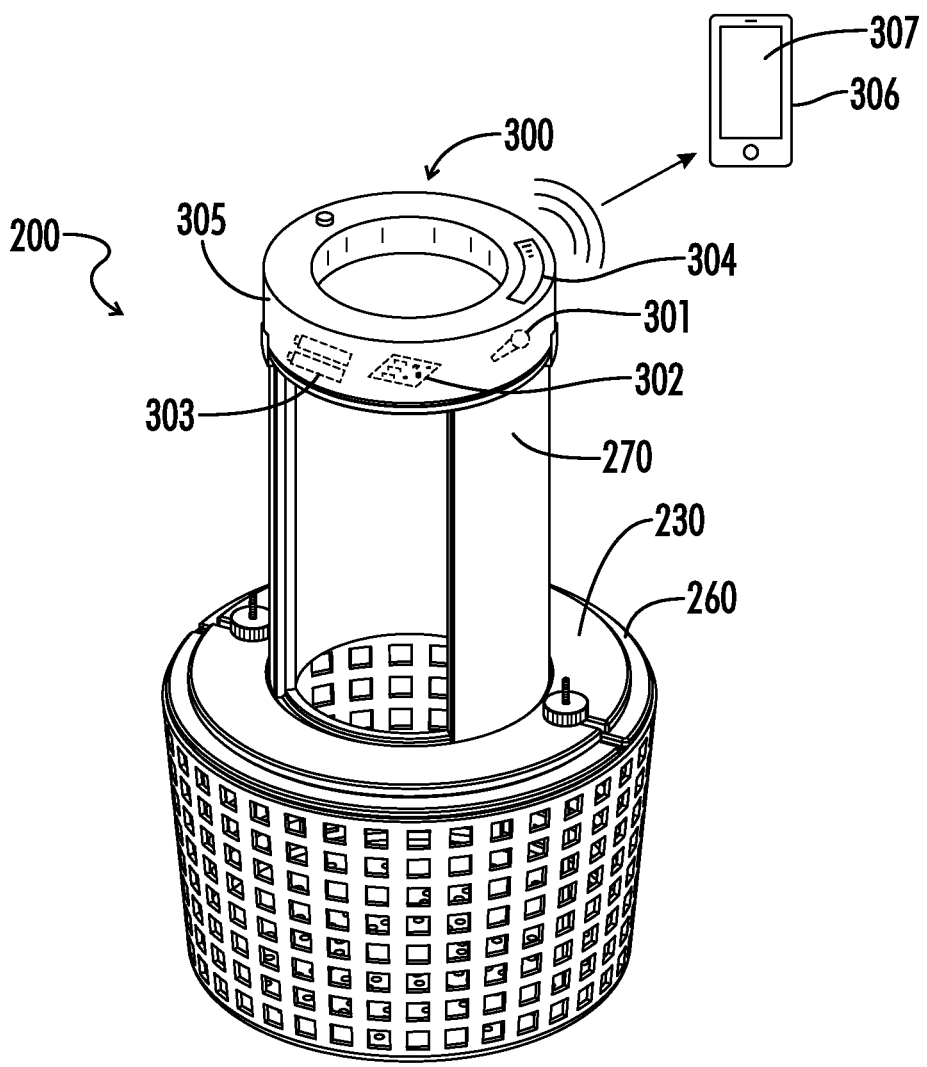
FIG. 5 illustrates a front, perspective, assembled view of the system of FIG. 4 with a remote computer (e.g., phone).
Figure 6:
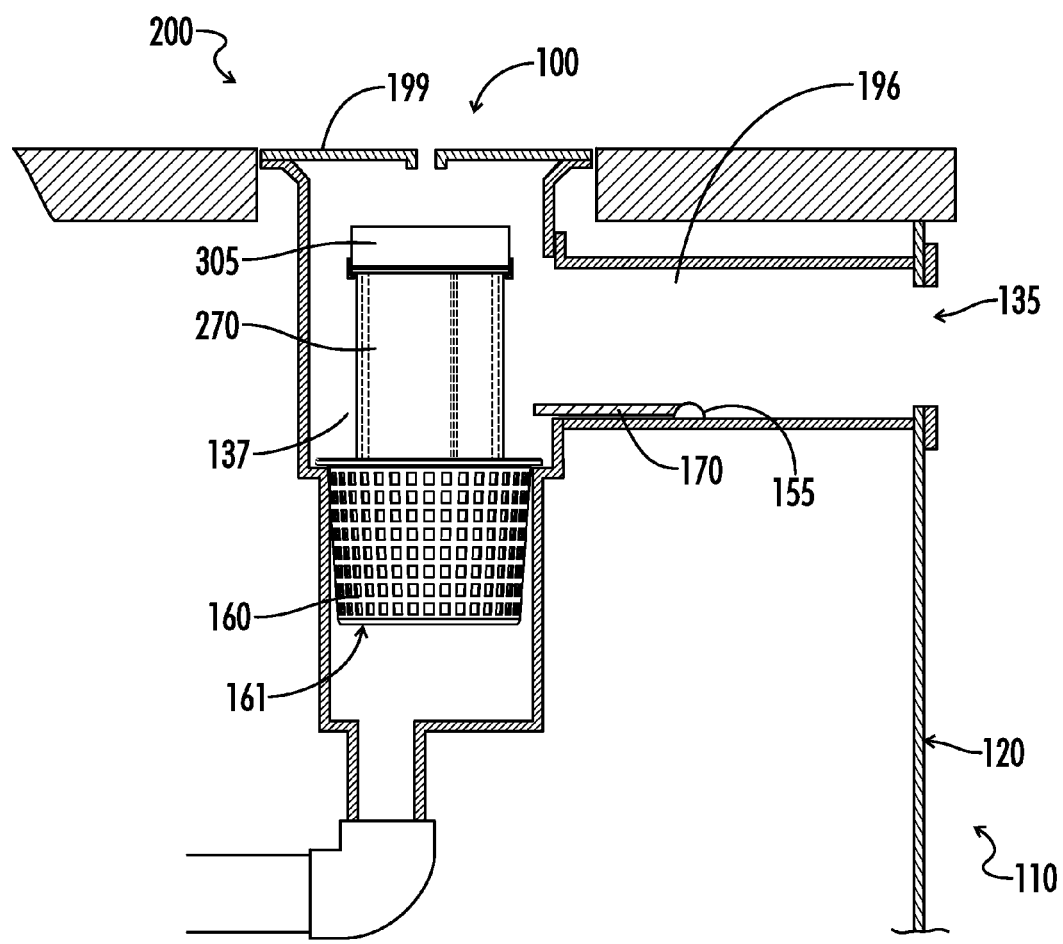
FIG. 6 illustrates a side cross-sectional view of the system of FIG. 4 located in a pool skimmer.

Referring further to the system 200, as shown in FIGS. 4-6, the system 200 may include a skimmer basket 160 configured to be placed in the interior 137 of a pool skimmer 100. The skimmer basket 160 has a basket interior 167, a basket exterior 168, a floor 161, a top/rim 162, a height 165 extending from the floor 161 to the top/rim 162, one or more sidewalls 163 extending upwardly from the floor 161, and a plurality of apertures 164 located in the floor 161 and/or the sidewalls 163. The basket floor 161 and the basket sidewall 163 separate the basket interior 167 from the basket exterior 168. In some embodiments, the basket 160 is generally cylindrical with the diameter of the cylinder decreasing from the top 162 to the floor 161 (e.g., a slight taper). In some embodiments, the basket floor 161 is substantially flat. However, the basket 160 can be any other suitable shape, such as rectangular. In some embodiments, the floor 161 is substantially flat.

The system 200 may further include a first tube 210 as described in U.S. Pat. No. 8,721,881 ("the '881 patent"), the entire contents of which are hereby incorporated by reference. As described in the '881 patent, when the system 200 is fully assembled, the first tube 210 optionally attaches to the skimmer basket 160 and is located above the basket floor 161. The first tube 210 optionally includes a wall 211 that forms the first tube 210, a top 214, a bottom 216 that includes a bottom opening 217, a first tube height extending from the bottom 216 to the top 214, an interior 212, an exterior 213 that includes a first flange 230 extending from the wall 211 towards the basket sidewall 163, and a first tube longitudinal slot 221. In some embodiments, there is no lip surrounding the bottom opening 217 so that the bottom opening 217 extends to the wall 211 forming the first tube 210. In other embodiments, a small lip surrounds the bottom opening 217 and the bottom opening 217 has a width/diameter of from about 3 to about 4 inches. In use, water and debris from the first tube exterior 213 enters the first tube interior 212 through the first tube longitudinal slot 221, flows through the bottom opening 217 and enters the basket interior 167. Optionally, the top 214 of the first tube 210 includes a top opening 215 so that water and debris may enter the inner tube interior 212 through the top opening 215 when water and debris are located above the top 214 of the first tube 210, which may occur when, for example, the water level in the skimmer 100 is particularly high. The first tube slot 221 preferably extends substantially the entire height of the first tube 210. Preferably, the first tube height is at least about 4 inches (e.g., about 4 inches to about 15 inches). Preferably, the first tube slot 221 has a width perpendicular to the first tube height and a height parallel to the first tube height. In some embodiments, the first tube slot has a width of at least about 1 inch (more preferably about 2 to about 5 inches) and a height of at least about 1 inch (more preferably about 4 inches to about 15 inches, even more preferably about 6 inches to about 9 inches). For example, the first tube slot may have an average width of about 1 inch to about 3.5 inches, even more preferably about 1 inch to about 3 inches, and even more preferably about 2 inches to about 3 inches. Preferably, the first tube 210 is generally cylindrical and the first tube 210 has an inner diameter (measured as the distance between opposing interior surfaces of the wall 211) and an outer diameter (measured as the distance between opposing exterior surfaces of the wall 211) of at least about 2 inches (more preferably, about 3 inches to about 9 inches). In some embodiments, the first tube 210 is generally cylindrical with the inner and outer diameters of the cylinder gradually increasing from the top 214 to the bottom 216 (e.g., a slight taper) to facilitate injection of the first tube 210 during plastic injection molding. The first tube wall 211 may have any desired thickness depending on the strength desired and the cost of the material. In some embodiments, the first tube wall thickness is from about 0.05 inches to about 2 inches. Optionally, the first tube 210 includes a knurled surface at the top 214 of the first tube 210 for gripping. Preferably, the bottom of the first tube slot 221 is adjacent to (more preferably about co-planar with) the top of the first flange 230, as shown in FIGS. 4-6. Preferably, the first tube slot 221 extends from the first flange 230 to the top 214 of the first tube 210. Preferably, the first tube 210 is immobile relative to the first flange 230.

In some embodiments, the first flange 230 is configured so that it alone, or in combination with a washer 260 (which is described in the '881 patent), inhibits (but does not necessarily prevents) water and debris from entering the basket 160 without first entering the slot 221 of the first tube 210. To accomplish this, the first flange 230 alone, or the first flange 230 and the washer 260, extends to or beyond the sidewall 163 of the basket 160 when the basket 160 is placed in the well 198 of the skimmer 100. The first flange 230 and, if included, the first flange 230 and the washer 260, are preferably adjacent to the top 162 of the skimmer basket 160. The purpose of the washer 260 is that it may be desirable to provide a universal system 200 that works with a number of different sized skimmer baskets 160 and the washer 260 allows the system 200 to be used with larger skimmer baskets 160 and, in combination with the first flange 230, the washer 260 substantially creates a seal to force water and debris into the slot 210. In some embodiments, the length and width of the first flange 230 (i.e., the diameter of the first flange 230 if the first flange 230 is circular) is at least about 4 inches (e.g., about 4-10 inches) and the length and width of the washer 260 (i.e., the diameter of the washer 260 if the washer 260 is circular) is larger than the length and width of the first flange 230—e.g., about 6 to about 14 inches—so that the washer 260 extends beyond the perimeter of the first flange 230. The first flange 230 and washer 260 can be any suitable shape, including generally circular and generally rectangular, depending on the shape of the basket 160. If included, the washer 260 includes a central opening 262 that is substantially aligned with the bottom hole 217 of the first tube 210 such that water and debris flows through the first slot 221, through the bottom hole 217, through the washer hole 262 and into the skimmer basket interior 167. In some embodiments, the washer hole 262 has a width/diameter of from about 3 inches to about 6 inches. If included, the washer 260 may be placed above or below the first flange 230. Preferably, the washer 260 is placed below the first flange 230 and the first tube 210 extends below the first flange 230 to assist in the positioning of the washer 260. It will be understood that the first flange 230 and washer 260 inhibit but do not necessarily prevent water and debris from entering the basket interior 167 without first entering the slot 221 of the first tube 210 because the first flange 230 and washer 260 may each comprise small fastener apertures as described below and water and debris may enter the top opening 215 of the first tube 210 if the water level in the skimmer 135 is high, as described above.

The purpose of using the first flange 230 alone or in combination with the washer 260 to inhibit water and debris from entering the basket 160 without first entering the slot 221 of the first tube 210 is that skimmer baskets in the prior art without the system 200 often lack a pump 190 with sufficient force to pull debris and water into the skimmer basket 160. However, by providing a first tube 210 with the slot 221, the present invention is able to take advantage of the Bernoulli principle, which holds that velocity of water increases when water flows through a narrow constriction. Thus, by constricting the flow of the water and debris into the basket 160 using the first tube slot 221, it has been observed that water and debris flows into the basket 160 at a higher rate than without the system 200. It has also been observed that offsetting the widthwise center of the slot 221 from the widthwise center of the skimmer opening 135 increases the flow of water and the debris into the basket 160 because the offset requires water and debris to travel around the first tube 210, like water draining in a toilet, before entering the slot 221. For example, if the widthwise center of the skimmer opening 135 is assigned the 6 o'clock position, it has been observed that positioning the widthwise center of the slot 221 at the 2 o'clock position is optimal in pools 110 that have a clockwise drain bias in the skimmer 100. It would be deduced that positioning the slot 221 at the 10 o'clock position would be optimal in pools 100 that a have counter-clockwise drain bias in the skimmer 100. Preferably, the widthwise center of the slot 221 is offset from the widthwise center of the skimmer opening 135 by at least about 30 degrees (e.g., about 30 degrees to about 330 degrees—i.e., between the 7 o'clock and 5 o'clock positions if the widthwise center of the skimmer opening 135 is assigned the 6 o'clock position).

The system 200 may further include a second tube 270 as described in the '881 patent. The second tube 270 is adjacent to the first tube 210 and rotatable relative to the first tube 210. The second tube 270 includes a wall 276 that forms the second tube 270, an interior, an exterior, a top 271, a bottom 274 that includes a bottom opening 273, a second tube height extending from the top to the bottom, and a second tube longitudinal slot 283 located between the top 271 and the bottom 274 of the second tube 270. Preferably, the second tube slot 283 has a width perpendicular to the second tube height and a height parallel to the second tube height. Preferably, the top 271 includes a top opening 272. A function of the second tube 270 is that the second tube 270 can be rotated relative to the first tube 210 to partially cover the first tube slot 221 to increase the velocity of water and debris flowing into the skimmer basket 160 and another function is that the second tube 270 can be rotated relative to the first tube 210 to close the first tube slot 221 when a user desires to remove the system 200 from the skimmer interior 137 in order to remove debris from the first tube 210 and the skimmer basket 160 (i.e., empty the first tube 210 and the skimmer basket 160). It has been observed that the velocity of water entering skimmer baskets 160 varies from pool to pool depending on pump 190 horsepower and whether the pump 190 has been recently cleaned. Thus, the second tube 270 allows a pool owner to rotate the second tube 270 relative to the first tube 210 to partially cover the first tube slot 221 when the owner has a weak pump 190 and/or a pump system that has not been recently cleaned (so as to increase the velocity of water and debris entering the skimmer basket 160) and to leave the first tube slot 221 uncovered (i.e., leaving the first and second tube slots 221 and 283 aligned) when the owner has a strong pump 190 and/or a pump system that has been recently cleaned. Preferably, the second tube 271 has one or more apertures opposite the second tube slot 283, which saves material cost, provides flexibility to the second tube 270, and allows the manufacturer to include graphics such as the product's name. In some embodiments, the second tube slot 283 has a width of at least about 1 inch (more preferably about 2 to about 5 inches) and a height of at least about 1 inch (more preferably about 4 inches to about 15 inches). Preferably, the second tube slot 283 has the same size and shape as the first tube slot 221. Preferably, the second tube 270 is generally cylindrical and the second tube 270 has an inner diameter (measured as the distance between opposing interior surfaces of the wall 276) and an outer diameter (measured as the distance between opposing exterior surfaces of the wall 276). Preferably, the second tube inner diameter is between 100 and 110% of the size of the first tube outer diameter so that the second tube 270 hugs the first tube 210. In other words, preferably the connection is tight enough so that both tubes 210 and 270 move vertically when a user lifts the system 200 out of the skimmer 100 to empty the basket 160 but the user is able to rotate the second tube 270 relative to the first tube 210 to open and close the slot 221. In some embodiments, the second tube inner diameter and the second tube outer diameter are at least about 2 inches (more preferably, about 3 inches to about 9 inches). Preferably, if the first tube 210 is tapered, as described above, the second tube 270 has a similar taper. The second tube wall 276 may have any desired thickness depending on the strength desired and the cost of the material. In some embodiments, the second tube wall thickness is from about 0.05 inches to about 2 inches. In some embodiments, the top surface of the first flange 230 includes a groove 235 that extends around a perimeter of the first tube 210 (more particularly, the circumference of the first tube 210 if the first tube 210 is cylindrical) to create a track for the second tube 270. In some embodiments, the width of the first flange groove 235 is from about 100% to about 120% of the second tube wall thickness so that the bottom 274 of the second tube 270 fits snugly in the groove 235. In some embodiments, the first tube 210 includes an upper flange 220 and the second tube is located between the first flange 230 and the upper flange 220. In such embodiments, the first tube height is greater than the second tube height. Optionally, the second tube 270 includes a plurality of protrusions/ears located at the top of the second tube 270 to make it easier for a user to rotate the second tube 270.

In some embodiments, the first tube 210 is located inside the second tube interior 281, as shown in FIGS. 4-6. In such embodiments, the inner diameter of the first tube 210 is different than the inner diameter of the second tube 270 and the outer diameter of the first tube 210 is different than the outer diameter of the second tube 270. Preferably, the first tube interior 212 is hollow. In other embodiments, the second tube 270 is located in the first tube interior 212.

Preferably, the first tube 210, the second tube 270, the washer 260 and the first flange 230 are comprised of plastic.

In some embodiments, the first flange 230 and the skimmer basket 160 are permanently attached to one another and the first and second tubes 210 and 270, first flange 230, and skimmer basket 160 are a single piece of plastic. In other embodiments, the first flange 230 and the skimmer basket 160 are mechanically attached to one another as described in the '881 patent. For example, the system 200 may include two hinge pins and two hinges so that the basket 160 can pivot relative to the first flange 230 upon removal of one of the hinge pins. In other embodiments, the first flange 230 and the inner rim of the basket 160 include mating threads so that the first flange 230 can removably attach to the basket 160. In such embodiments, the washer 260 may include threads that mate with threads located in the inner rim of the basket and the bottom surface of the first flange 230 may include one or more protrusions that mate with and lock into apertures in the washer 260 so that the washer 260 is removably attached to the first flange 230. In some embodiments, the first flange 230 and the skimmer basket 160 may be removably attached by a fastener. In some such embodiments, the fastener includes a series of bolts, washers, and nuts. In some embodiments, the bolt includes threads and the bolt passes through the apertures located in the floor 161 of the basket 160. Preferably, the bolt has a length of at least 3 inches (e.g., about 3 to about 12 inches). Preferably, the top end of the bolt passes through one or more fastener apertures located in the first flange 230 and one or more fastener apertures located in the washer 260. Preferably, the washer fastener apertures substantially extend to the outer edge of the washer 260 and the first flange fastener apertures substantially extend to the outer edge of the first flange 230 which makes the system 200 easy to assemble. Alternatively, instead of a bolt, the system 200 may include a threaded rod that has a nut and washer at each end. In other embodiments, the interior of the first tube 210 includes a ledge and the top end of the bolt passes through an aperture located in the ledge, as seen in FIGS. 15-19 of the '881 patent. It has been observed that a stainless steel threaded rod or bolt having 4-40 thread is particularly well-suited for use with the present system 200. In other embodiments, instead of a bolt or threaded rod, the fastener may be an O-ring that attaches to a post located in the first tube interior 212, as shown in FIGS. 20-22 of the '881 patent.

The system 200 further includes an electronic flow sensor system 300 located in the skimmer interior 137 and configured to analyze water flowing through the skimmer interior 137. In other words, the flow sensor system 300 uses a sensor 301 to sense a property of the water flowing through the skimmer interior 137 and the flow sensor system 300 analyzes this information to, for example, determine the velocity of water flowing through the skimmer interior 137 or to determine other disturbances in the skimmer interior 137 (such as a splash associated with a person jumping into the pool 110). For example, in some embodiments, the sensor 301 is a microphone configured to capture sound waves from water flowing through the skimmer interior 137 and transduce these sound waves into electrical signals, and the flow sensor system 300 further includes a microprocessor 302 in communication with the microphone 301 and configured to process the microphone 301 signals, and a power source (e.g. a battery) 303 to power the microphone 301 and microprocessor 302. Preferably, the system 300 includes a memory to 1) store an executable program to control the microprocessor 302, 2) store a baseline sound level (as described below) and 3) store data until the remote computer 306 is in range. Optionally, the flow sensor system 300 further includes a transmitter 304 (e.g., a transceiver) to transmit the data/processed signals to a remote computer 306. For example, as shown in FIGS. 4-6, the microphone 301, microprocessor 302, power source 303 and transmitter 304 may be located in a waterproof ring 305 that attaches to the first tube 210 or second tube 270. Alternatively, the microphone 301, microprocessor 302, power source 303 and transmitter 304 may be attached to the access lid 199. To illustrate use of the system, a Hayward SP1082 skimmer basket 160 (Hayward Industries, Elizabeth N.J.) and the SKIMDOCTOR product (Totally New Technologies, Goodlettsville Tenn.) were placed in an in-ground pool skimmer 100 servicing an in-ground pool 110. (The SKIMDOCTOR is the commercial embodiment of the '881 patent and includes a first tube 210, a first tube flange 230 that bolts to the skimmer basket 160, and a second tube 270 that is exterior and rotates relative to the first tube 210). The SOUND METER ANDROID application (Smart Tools Co., Seoul, Korea) was loaded onto a SAMSUNG GALAXY tablet computer (KOREA) and then the tablet computer was placed inside the pool skimmer interior 137 above the first and second tubes 210 and 270. A first pump 190 connected to the skimmer 100 was turned on. The SOUND METER application then displayed the decibel level using the tablet's microphone 301 as the input. It was observed that a clean (e.g., debris free) skimmer basket 160 gave a reading of 55 to 65 decibels. As debris was added to the skimmer basket 160, the decibel level steadily rose. (This was surprising and unexpected as it was believed that a more full basket 160 would cause the decibel level to decrease). A second pump 190 connected to the skimmer 100 was turned on, and the agitation inside the skimmer interior 137 increased and the decibel level measured by the microphone 301 increased.

As another demonstration, the system 200 was tested in a rectangular aquarium, the aquarium measuring 2 feet in height by 2 feet in width by 2 feet in length. The rear wall of the aquarium included a Hayward SP1082 skimmer 100. The system 200 also included a Hayward SP1082 skimmer basket 160 and the SKIMDOCTOR product. A microphone 301 was placed below the top access lid 199 of the skimmer 100 and the lid 199 was closed (so that it closed opening 197). The microphone 301 was connected to a laptop computer 306 running the Raven Interactive Sound Analytics software program (Bioacoustics Research Program, Cornell Lab of Ornithology). A one horsepower pump 190 connected to the skimmer 100 was turned on. The decibel level was measured with a clean skimmer basket 160 and with a skimmer basket 160 filled with debris, and it was seen that the decibel level increased when the skimmer basket 160 was filled with debris. Also, a water bottle was dropped into the aquarium (outside of the skimmer 100), and the sound level in decibels temporarily spiked upon the drop of the water bottle.

The above demonstrations show that a microphone 301 can be used to detect when the basket 160 should be emptied and when a person has fallen into the pool 110.

Figure 7:
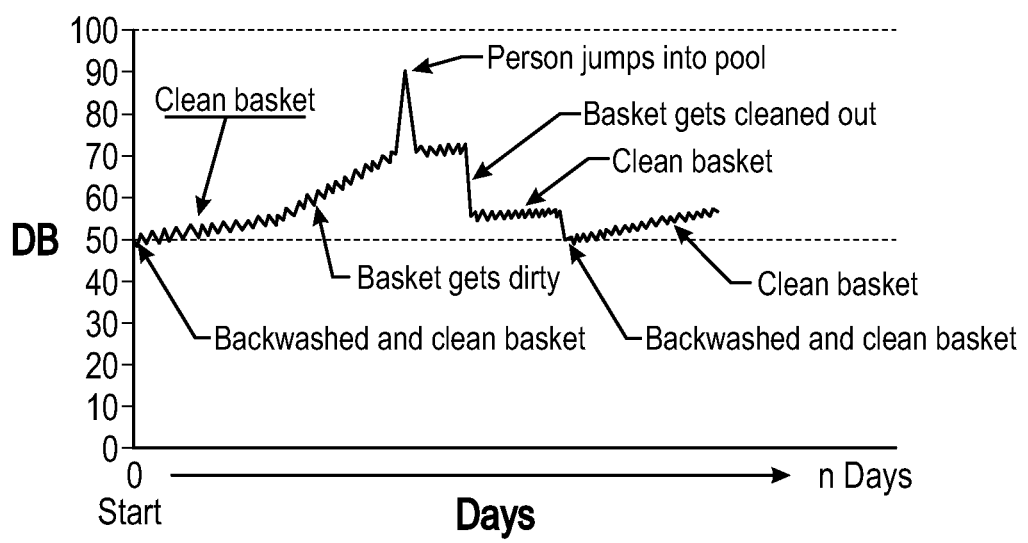
FIG. 7 is an illustrative graph showing decibel readings measured by the flow sensor system of FIG. 6 over time in the pool skimmer.

To illustrate this further a hypothetical graph is shown in FIG. 7 where db on the y-axis represents decibels. At time 0, we have a clean basket 160, a clean sand filter and the decibel level in the skimmer interior 137 is 50 db (decibels). The decibel level slowly increases over time as the basket 160 gets more filled with debris and the sand filter gets dirtier. A person jumps into the pool 110 and the decibel level spikes. The user empties the basket 160 and the decibel level quickly goes to 55 decibels. The user then backwashes the sand filter and the decibel level goes to the starting level, namely 50 decibels.

Instead of a microphone 301, another type of sensor 301, such as a paddle wheel or a weir connected to a microprocessor 302, can be used to determine flow inside the skimmer interior 137 and report such findings to the remote computer 306.

Preferably, information is transferred from the flow sensor system 300 to the remote computer 306 wirelessly (e.g., via Bluetooth or Wifi protocol).

Preferably, if the sensor 301 is a microphone, the microphone 301, microprocessor 302, power source 303 and transmitter 304 are located in a ring 305 that snaps onto the upper flange 220 of the first tube 210 (e.g., using a clip 308) and the first tube 210 acts like a megaphone to transmit the sound waves to the microphone 301. The ring 305 may include additional features such as buttons 309 or a display to allow a user to control the flow sensor system 300 without using the remote computer 306. Optionally, the remote computer 306 is a mobile telephone comprising a display/graphical user interface 307 (e.g., a touchscreen). Optionally, the data packets transmitted from the flow sensor system 300 to the remote computer 306 are time stamped.

One advantage of using the microphone 301 in conjunction with the first and second tubes 210 and 270 is that the first and second tubes 210 and 270 increase agitation in the skimmer interior 137, as a Bernoulli effect is achieved. In addition, the first and second tubes 210 and 270 act as a megaphone to amplify the sound waves as they are carried to the microphone 301. Thus, the sound waves can be readily picked up by the microphone 301.

The same system 300 can also be used in different pool systems, as the system preferably compares the sound level at a particular point of time against the system's 300 baseline for a particular skimmer environment. In particular, although two pools 110 may have different decibel levels in their skimmer interiors 137 (due to, for example, the fact that the pools 110 have different horsepower pumps 190 and/or pumps 190 that are located at different distances from the skimmer 100), the flow measure system 300 compares the decibel level at a particular point of time against the baseline stored in the flow measure system's 300 memory for a clean skimmer basket 160 and a clean sand filter. For example, as described above, the baseline in FIG. 7 is 50 decibels; thus, in this case, the system 300 alerts the user to empty the basket 160 and backwash the filter when the decibel level has increased a certain percentage or amount above the 50 decibel baseline. In another pool, the baseline may be 30 decibels, for example, and in this case, the system 300 alerts the user to empty the basket 160 and backwash the filter when the decibel level has increased a certain percentage or amount above the 30 decibel baseline. To establish and store this baseline, the user may press a button 309 on the ring 305 and the system 300 may then collect and analyze the sound waves to establish the baseline decibel level.

The system 300 and/or software running on the remote computer 306 may also account for the fact that additional pumps 190 have turned on. For example, although adding pumps 190 may increase decibel level if they are in communication with the same skimmer 100, it has been observed that the decibel level when a pump 190 has been added increases very quickly (whereas decibel level gradually increases slowly over time when a basket 160 gets more filled with debris and the sand filter gets dirtier). In addition, pumps 190 are usually operated on a timer and a software program running on the remote computer 306, for example, may know to ignore increases during the daily time interval that the additional pump 190 is turned on. Further, the software program may have different baselines for different time intervals during the day.

Optionally, the ring 305 includes a clean basket button for the user to push when the basket 160 is emptied. Optionally, the system 300 estimates when the user needs to backwash the filter. For example, assume that the baseline level for a clean filter and clean/empty basket 160 for a particular system is 30 decibels and the threshold for a dirty filter (i.e., a filter that is so dirty that it must be backwashed) is 60 decibels if the basket 160 is empty. Next assume that the user has emptied the basket three times over five weeks and, upon emptying the basket 160 at the end of the five weeks, the decibel level is 36 decibels. Thus, the decibel level has risen 6 decibels over 840 hours (5 weeks) on account of the filter becoming dirtier, or 1 decibel (db) every 140 hours. Because the filter must be backwashed when the level rises 24 more decibels to the 60 decibel threshold, the program on the remote computer 306 can alert the user that the filter should be backwashed in about 140 days (24 decibels*140 hours*1 day/24 hours).

Optionally, the flow sensor systems 300 include a camera (not shown), located for example on the ring 305, and the microprocessor 302 is in communication with the camera and is configured to transmit images taken from the camera to the remote computer 306. A purpose of the camera is that it may be used to verify that the basket 160 needs to be emptied.

Optionally, instead of being used in a skimmer 100 that is located in a pool sidewall 120, the system 200 is used in a skimmer 100 that attaches to the sidewall 120 using an arm. Skimmers 100 attached to the pool sidewall 120 are known in the art and include the INTEX Deluxe Wall Mount Swimming Pool Surface Skimmer and are described in, for example, FIG. 36 of the '881 patent.

In still further embodiments, the system 300 includes:
a pool 110 comprising a basin;
a microphone system comprising a microphone 301 adjacent to the basin and configured to capture sound waves and transduce the sound waves into electrical signals, a microprocessor 302 in communication with the microphone 301 and configured to process signals received from the microphone 301, and a power source 303 configured to power the microphone 301 and the microprocessor 302; and a pump 190 configured to pump water from the skimmer interior 137 to the pool basin, the pump 190 in electronic communication with the microphone system.

For example, the microphone system may be in direct or indirect communication with the pump 190 and the pump 190 may be configured to turn on when the microphone system detects the presence of people in the pool basin. In a non-limiting embodiment, the microphone system may be located in the skimmer interior 137 (e.g., attached to the ring 305 as described above) and the microphone 302 may, for example, detect people moving in the pool basin and send an electrical signal directly to the pump 190 or indirectly to the pump 190 through the remote computer to tell the pump 190 to turn on.

Terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention, as defined and limited solely by the following claims.

What is claimed is:

1. A system for measuring the operation of a pool skimmer comprising:
   a skimmer basket, the skimmer basket configured to be placed in a pool skimmer and comprising a basket interior, a basket exterior, a floor, a top, a height extending from the floor to the top, a sidewall extending upwardly from the floor, and a plurality of apertures located in at least one of the basket sidewall and the floor, wherein the basket floor and the basket sidewall separate the basket interior from the basket exterior;
   a first tube attached to the skimmer basket, the first tube comprising a top, a bottom comprising an opening, a first tube height extending from the bottom to the top, an interior, an exterior comprising a first flange extending from the first tube towards the basket sidewall, and a first tube slot configured to feed water from the first tube exterior to the first tube interior and the basket interior, the first tube slot located between the top and the bottom of the first tube, the first tube slot having a width perpendicular to the first tube height and a height parallel to the first tube height; and
   a flow sensor system connected to the skimmer basket and configured to analyze water flowing through the system.

2. The system for measuring the operation of a pool skimmer of claim 1, wherein the flow sensor system comprises a microphone configured to capture sound waves from water flowing through the system for measuring the operation of a pool skimmer and transduce the sound waves into electrical signals, a microprocessor in communication with the microphone and configured to process signals received from the microphone, and a power source configured to power the microphone and the microprocessor.

3. The system for measuring the operation of a pool skimmer of claim 2, wherein the flow sensor system further comprises a transmitter configured to wirelessly transmit signals from the flow sensor system to a remote computer.

4. The system for measuring the operation of a pool skimmer of claim 3, wherein the remote computer is a mobile telephone comprising a graphical user interface.

5. The system for measuring the operation of a pool skimmer of claim 1, wherein the flow sensor system is attached to the first tube.

6. The system for measuring the operation of a pool skimmer of claim 1, wherein the system for measuring the operation of a pool skimmer further comprises a second tube adjacent to the first tube, the second tube configured to rotate relative to the first tube and at least partially cover the first tube slot, the second tube comprising a top, a bottom, a second tube height extending from the bottom to the top, and a second tube slot located between the top and the bottom of the second tube, the second tube slot having a width perpendicular to the second tube height and a height parallel to the second tube height.

7. The system for measuring the operation of a pool skimmer of claim 6, wherein the tops of the first and second tubes each comprise openings.

8. The system for measuring the operation of a pool skimmer of claim 6, wherein the first tube is located inside the second tube interior.

9. The system for measuring the operation of a pool skimmer of claim 6, wherein the width of the first tube slot is at least about 1 inch, the width of the second tube slot is at least about 1 inch, the height of the first tube slot is at least about 4 inches and the height of the second tube slot is at least about 4 inches.

10. The system for measuring the operation of a pool skimmer of claim 1 further comprising a pool, the pool comprising a sidewall, the pool sidewall comprising a pool skimmer, the pool skimmer comprising a skimmer interior, a plurality of walls defining the skimmer interior and a skimmer opening leading from the pool to the skimmer interior and further wherein the basket is located in the skimmer interior.

11. A method of measuring the velocity of water flowing into a skimmer basket, the method comprising the steps of:
   providing the system for measuring the operation of a pool skimmer of claim 1;
   flowing water through the slot of the first tube; and
   measuring the velocity of water entering through the slot of the first tube using the flow sensor system.

12. A pool skimmer system comprising:
   a pool comprising a basin;
   a skimmer interior, a plurality of walls defining the skimmer interior and a skimmer opening leading from the pool basin to the skimmer interior;
   a pump configured to pump water from the skimmer interior to the pool basin;
   a remote computer; and
   a flow sensor system configured to measure water flowing through the skimmer interior, the sensor system comprising a sensor configured to generate electrical signals in response to conditions in the system, a power source configured to power the sensor, and a transmitter configured to wirelessly transmit signals from the flow sensor system to the remote computer.

13. The pool skimmer system of claim 12 wherein the sensor is a microphone configured to flow sensor system comprises a microphone configured to capture sound waves from water flowing through the skimmer interior and transduce the sound waves into an electrical signal, a microprocessor in communication with the microphone and configured to process signals received from the microphone, and a power source configured to power the microphone and the microprocessor.

14. The pool skimmer system of claim 12 wherein the remote computer is a mobile telephone.

15. A pool skimmer system comprising:
- a pool comprising a basin;
- a skimmer interior, a plurality of walls defining the skimmer interior and a skimmer opening leading from the pool basin to the skimmer interior;
- a pump configured to pump water from the skimmer interior to the pool basin; and
- a flow sensor system comprising a microphone configured to capture sound waves from water flowing through the skimmer interior and transduce the sound waves into electrical signals, a microprocessor in communication with the microphone and configured to process signals received from the microphone, and a power source configured to power the microphone and the microprocessor.

* * * * *